United States Patent
Teyeb et al.

(10) Patent No.: US 11,457,498 B2
(45) Date of Patent: *Sep. 27, 2022

(54) HANDLING OF PDCP DURING CONNECTION RE-ESTABLISHMENT

(71) Applicant: TELEFONAKTIEBOLAGET LM ERICSSON (PUBL), Stockholm (SE)

(72) Inventors: Oumer Teyeb, Montréal (CA); Gunnar Mildh, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/543,260

(22) Filed: Dec. 6, 2021

(65) Prior Publication Data

US 2022/0095405 A1  Mar. 24, 2022

Related U.S. Application Data

(63) Continuation of application No. 17/349,013, filed on Jun. 16, 2021, which is a continuation of application
(Continued)

(51) Int. Cl.
| | | |
|---|---|---|
| *H04W 76/19* | (2018.01) | |
| *H04W 12/10* | (2021.01) | |
| *H04W 76/10* | (2018.01) | |

(52) U.S. Cl.
CPC .......... *H04W 76/19* (2018.02); *H04W 12/10* (2013.01); *H04W 76/10* (2018.02)

(58) Field of Classification Search
CPC ..... H04W 76/19; H04W 76/10; H04W 12/10; H04W 12/08; H04W 76/15
(Continued)

(56) References Cited

U.S. PATENT DOCUMENTS 9,007,899 B2 * 4/2015 Kotecha ............. H04L 47/6275
                                                              370/444
9,191,982 B2   11/2015 Wu
(Continued)

FOREIGN PATENT DOCUMENTS

| CN | 107079382 B | 9/2020 |
|---|---|---|
| EP | 2922364 A1 | 9/2015 |

(Continued)

OTHER PUBLICATIONS

3GPP, "3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 8)", Technical Specification, 3GPP TS 36.523-1 V8.1.0, Mar. 2009.

(Continued)

*Primary Examiner* — Rownak Islam

(57) ABSTRACT

Systems and methods are disclosed for a host providing an over-the-top service. An example host includes processing circuitry to provide user data associated with the service and a network interface to initiate transmission of the user data from a network node in a cellular network. The network node is configured to provide a Radio Resource Control connection re-establishment message to a user equipment (UE) previously connected to the RAN via Signaling Radio Bearer 1 (SRB1). SRB1 is configured with a New Radio Packet Data Convergence Protocol (PDCP) configuration. After the UE receives the RRC connection re-establishment message, the UE derives security keys. The network node is further configured to re-establish the UE's connection to the RAN, by applying a Long-Term Evolution (LTE) PDCP configuration to SRB1 and applying ciphering using the (Continued)

plurality of derived security keys, and to transmit the user data over the re-established connection.

12 Claims, 7 Drawing Sheets

Related U.S. Application Data

No. 16/331,633, filed as application No. PCT/IB2018/058341 on Oct. 25, 2018, now Pat. No. 11,051,354.

(60) Provisional application No. 62/586,348, filed on Nov. 15, 2017.

(58) Field of Classification Search
USPC .......................................................... 370/329
See application file for complete search history.

(56) References Cited

U.S. PATENT DOCUMENTS

| 2013/0039339 | A1 | 2/2013 | Rayavarapu et al. | |
|---|---|---|---|---|
| 2014/0233479 | A1* | 8/2014 | Dahod ................ | H04N 21/631 |
| | | | | 370/329 |
| 2014/0313902 | A1* | 10/2014 | Bruner .............. | H04W 28/0236 |
| | | | | 370/235 |
| 2017/0208488 | A1 | 7/2017 | Hwang et al. | |
| 2017/0215225 | A1 | 7/2017 | Yi et al. | |
| 2018/0352601 | A1 | 12/2018 | Park et al. | |
| 2019/0037635 | A1 | 1/2019 | Guo et al. | |
| 2019/0159274 | A1 | 5/2019 | Hong et al. | |
| 2019/0223202 | A1* | 7/2019 | Byun ................ | H04W 72/042 |
| 2020/0178128 | A1 | 6/2020 | Ingale et al. | |
| 2020/0178208 | A1 | 6/2020 | Kim et al. | |
| 2020/0178332 | A1 | 6/2020 | Sharma et al. | |
| 2020/0196374 | A1 | 6/2020 | Lim et al. | |
| 2020/0214070 | A1 | 7/2020 | Ingale et al. | |
| 2020/0245393 | A1 | 7/2020 | Teyeb et al. | |
| 2020/0245401 | A1 | 7/2020 | Ingale et al. | |

FOREIGN PATENT DOCUMENTS

| EP | 3399830 A1 | 11/2018 |
|---|---|---|
| EP | 34746251 A | 4/2019 |
| RU | 2015109937 A | 10/2016 |
| WO | 2014182233 A2 | 11/2014 |
| WO | 2017115452 A1 | 6/2017 |
| WO | 2017171919 A1 | 10/2017 |
| WO | 2019031947 A1 | 2/2019 |

OTHER PUBLICATIONS

Ericsson, "Preserving NR PDCP version", 3GPP TSG-RAN WG2 Meeting #99bis, Prague, Czech Republic, Oct. 9-13, 2017, pp. 1-10, R2-1711137, 3GPP.

ETSI TR 138.912, 5G: Study on new radio access technology (3GPP TR 38.912 version 14.1.0 Release 14), V14.1.0, 78 pages, Oct. 2017.

Huawei et al., "NR PDCP for SRB for a UE accessing 5GC via ng-eNB", 3GPP TSG-RAN WG2 Meeting #99bis, Prague, Czech Republic, Oct. 9-13, 2017, pp. 1-3, R2-1711110, 3GPP.

Samsung, "PDCP operations during PDCP version change in EN-DC", 3GPP TSG-RAN WG2 Meeting #99bis, Prague, Czech Republic, Oct. 9-13, 2017, pp. 1-12, R2-1711146, 3GPP.

Ericsson, "LTE re-establishment when using NR PDCP (TP to 36.331 and 38.331)", 3GPP TSG-RAN WG2 #100, R2-1713388, Reno, Nevada, USA, Nov. 27-Dec. 1, 2017.

Ericsson, "Mobility between LTE and NR for inactive UEs", 3GPP TSG-RAN WG2 #99, R2-1710836, Prague, Czech Republic, Oct. 9-13, 2017.

* cited by examiner

HANDLING OF PDCP DURING CONNECTION RE-ESTABLISHMENT

RELATED APPLICATIONS

This application is a continuation of U.S. application Ser. No. 17/349,013, filed Jun. 16, 2021, which is continuation of U.S. application Ser. No. 16/331,633, filed Mar. 8, 2019, issued as U.S. Pat. No. 11,051,354 on Jun. 29, 2021, which is a 371 of International Application No. PCT/IB2018/058341, filed Oct. 25, 2018, which claims priority to U.S. Application No. 62/586,348, filed Nov. 15, 2017, the disclosures of which are fully incorporated herein by reference.

TECHNICAL FIELD

The present disclosure relates to wireless communication systems such as cellular networks, and more particularly to techniques performed by a user equipment (UE) and/or network node(s) to configure a connection in a network.

BACKGROUND

Radio Resource Control Protocol

In the long-term evolution (LTE) standard, the Radio Resource Control (RRC) protocol is used to configure/setup and maintain a radio connection between a UE and an evolved node B (eNB) base station in a radio access network (RAN). When the UE receives an RRC message from the base station, the UE will apply/compile the configuration, and if this succeeds the UE generates an RRC complete message that indicates the transaction identifier (ID) of the message that triggered this response.

Since LTE-release 8, three Signaling Radio Bearers (SRBs), namely SRB0, SRB1 and SRB2, have been available for the transport of RRC and Non Access Stratum (NAS) messages between the UE and base station. A new SRB, known as SRB ibis, was also introduced in rel-13 for supporting DoNAS (Data Over NAS) in NB-IoT.

SRB0 is for RRC messages using the CCCH logical channel, and it is used for handling RRC connection setup, RRC connection resume and RRC connection re-establishment. Once the UE is connected to the base station (i.e. RRC connection setup or RRC connection reestablishment/resume has succeeded), SRB1 is used for handling RRC messages (which may include a piggybacked NAS message) as well as for NAS messages prior to the establishment of SRB2, all using DCCH logical channel.

SRB2 is for RRC messages that include logged measurement information as well as for NAS messages, all using DCCH logical channel. SRB2 has a lower priority than SRB1, because logged measurement information and NAS messages can be lengthy and could cause the blocking of more urgent and smaller SRB1 messages. SRB2 is always configured by E-UTRAN after security activation.

Dual Connectivity in LTE

E-UTRAN supports Dual Connectivity (DC) operation whereby a multiple receiver (Rx)/transmitter (Tx) UE in RRC_CONNECTED is configured to utilize radio resources provided by two distinct schedulers, located in two base stations connected via a non-ideal backhaul over the X2 interface (see 3GPP 36.300). Base stations involved in DC for a certain UE may assume two different roles: a base station may either act as an MN (Master node) or as an SN (Secondary node). In DC a UE is connected to one MN and one SN.

In LTE DC, the radio protocol architecture that a particular bearer uses depends on how the bearer is set up. Three bearer types exist: MCG (Master Cell Group) bearer, SCG (Secondary Cell Group) bearer, and split bearers. RRC is located in MN and SRBs (Signaling Radio Bearers) are always configured as MCG bearer type and therefore only use the radio resources of the MN.

LTE-NR Dual Connectivity

LTE-NR (New Radio) DC (also referred to as LTE-NR tight interworking) is currently being discussed for rel-15. In this context, the major changes from LTE DC include, but are not limited to: the introduction of split bearer from the SN (known as SCG split bearer); the introduction of split bearer for RRC; and the introduction of a direct RRC from the SN (also referred to as SCG SRB).

The SN is sometimes referred to as SgNB (where gNB is an NR base station), and the MN as MeNB in case the LTE is the master node and NR is the secondary node. In the other case where NR is the master and LTE is the secondary node, the corresponding terms are SeNB and MgNB.

Split RRC messages are mainly used for creating diversity, and the sender can decide to either choose one of the links for scheduling the RRC messages, or it can duplicate the message over both links. In the downlink, the path switching between the MCG or SCG legs or duplication on both is left to network implementation. On the other hand, for the UL, the network configures the UE to use the MCG, SCG, or both legs. The terms "leg" and "path" are used interchangeably throughout this document.

The following terminologies are used throughout this text to differentiate different dual connectivity scenarios: (1) DC: LTE DC (i.e. both MN and SN employ LTE); (2) EN-DC: LTE-NR dual connectivity where LTE is the master and NR is the secondary; (3) NE-DC: LTE-NR dual connectivity where NR is the master and LTE is the secondary; (4) NR-DC (or NR-NR DC): both MN and SN employ NR; AND (5) MR-DC (multi-RAT DC): a generic term to describe where the MN and SN employ different RATs (EN-DC and NE-DC are two different example cases of MR-DC).

Bearer Harmonization in EN-DC

In RAN2 it has been agreed to harmonize what was formerly called MCG bearers, MCG split bearers, SCG bearers, and SCG split bearers in the following way:

- It is possible to configure the UE to use NR Packet Data Convergence Protocol (PDCP) for all the bearers (even when the UE is operating in standalone LTE mode and EN-DC is not set up);
- For all bearers configured with NR PDCP it is possible to configure the UE to either use KeNB or S-KeNB as security key (S-KeNB is also referred to as S-KgNB in the context of EN-DC); and
- The configuration of the PDCP layers is separated from the configuration of the lower layers of the MCG and SCG leg.

From a UE point of view this means that there are only 3 different bearers, namely:

- MCG bearer that uses the radio of the MN node only;
- SCG bearer that uses the radio of the SN node only; and
- The split bearer that uses the radio of both the MN and SN.

Where these bearers are terminated in the network is not important from the UE's perspective anymore, i.e. the UE will just use the key that is being configured from each bearer. From a RAN2 point of view it is fully supported to set up MCG bearers being terminated in the SN node using S-KeNB and SCG bearers being terminated in the MN node.

Similarly, it is possible to support both SN- and MN-terminated bearers at the same time, i.e. both SN-terminated split bearers and MN-terminated split bearers.

RRC Connection Re-Establishment

In LTE, a UE initiates the RRC Connection Re-establishment procedure when one of the following happens: upon detecting radio link failure, upon handover failure, upon mobility from E-UTRA failure, upon integrity check failure indication from lower layers, or upon an RRC connection reconfiguration failure. The purpose of this procedure is to re-establish the RRC connection, which involves the resumption of SRB1 (SRB ibis for a NB-IoT UE for which AS security has not been activated) operation, the re-activation of security (except for a NB-IoT UE for which AS security has not been activated), and the configuration of only the PCell (i.e. CA or DC operations are not re-established).

The connection re-establishment succeeds only if the concerned cell is prepared i.e. has a valid UE context. In case E-UTRAN accepts the re-establishment, SRB1 operation resumes while the operation of other radio bearers remains suspended. If AS security has not been activated, the UE does not initiate the procedure, but instead moves to RRC_IDLE directly. E-UTRAN applies the procedure as follows:

When AS security has been activated:
to reconfigure SRB1 and to resume data transfer only for this RB;
to re-activate AS security without changing algorithms; and
For a NB-IoT UE supporting RRC connection re-establishment for the Control Plane CIoT EPS optimisation, when AS security has not been activated, to re-establish SRB ibis and to continue data transfer for this RB.

Relating to the RRCConnectionReestablishmentRequest message, the UE includes a UE identity (ReestabUE-Identity) parameter, which is composed of the C-RNTI that was assigned to the UE before connection was lost, the Physical cell ID (physCellId) of the cell where the UE was connected to, and a shortMAC-I, which is calculated based on the C-RNTI and physCellld, and used to identify and verify the UE. The UE may request a connection to a cell/base station that is different from the one where the connection was lost, and in this case, the target base station will request the UE context from the base station to which the UE was connected (as indicated by the phyCellld).

The contents of the RRCConnectionReestablishment message include an optional RadioResourceConfigDedicated information element (IE). In the definition of the RadioResourceConfigDedicated IE, the srb-ToAddModList and drb-ToAddModList IEs are conditionally present. Srb-ToAddModList includes a HO-Conn condition. Drb-ToAddModList includes a HO-toEUTRA condition. These conditions are defined as follows in 36.331:

Accordingly, based on the above, only SRB1 can be included in the srb-ToAddModList condition and drb-ToAddModList is not included in the re-establishment message.

SUMMARY

The examples disclosed in the present disclosure provide techniques for reducing latency and/or improving communications in a wireless network by applying a correct PDCP version (NR or LTE) to a signaling radio bearer during an RRC connection re-establishment signalling procedure. Other advantages may be readily apparent to one having skill in the art. Certain embodiments may have none, some, or all of the recited advantages.

In an example embodiment, a method performed by a UE includes establishing a connection to a network (such as a RAN) via a network node, where the connection provides communications between the UE and the network node using a Signaling Radio Bearer (SRB) configured with a New Radio (NR) Packet Data Convergence Protocol (PDCP) configuration. The method further includes the UE receiving an RRC connection re-establishment message. The method further includes the UE re-establishing the connection to the RAN, where the re-establishing including applying a Long-Term Evolution (LTE) PDCP configuration to the SRB.

In another example embodiment, a method performed by a network node in a RAN includes providing an RRC connection re-establishment message to a UE that was previously connected to the RAN via a Signaling Radio Bearer (SRB) configured with a New Radio (NR) Packet Data Convergence Protocol (PDCP) configuration. The method further includes re-establishing the UE's connection to the RAN, the re-establishing including applying a Long-Term Evolution (LTE) PDCP configuration of the SRB.

In yet other examples, a system includes the user equipment and/or the network node that perform the above methods. Further, the present disclosure also provides a non-transitory computer-readable medium comprising computer instructions stored thereon that, when executed by processing circuitry, cause the processing circuitry to perform either of the above methods.

BRIEF DESCRIPTION OF THE DRAWINGS

For a more complete understanding of the disclosed embodiments and their features and advantages, reference is now made to the following description, taken in conjunction with the accompanying drawings.

| | |
|---|---|
| HO-Conn | The field is mandatory present in case of handover to E-UTRA or when the fullConfig is included in the RRCConnectionReconfiguration message or in case of RRC connection establishment (excluding RRConnectionResume); otherwise the field is optionally present, need ON. Upon connection establishment/re-establishment only SRB1 is applicable (excluding RRConnectionResume). |
| HO-toEUTRA | The field is mandatory present in case of handover to E-UTRA or when the fullConfig is included in the RRCConnectionReconfiguration message; In case of RRC connection establishment (excluding RRConnectionResume); and RRC connection re-establishment the field is not present; otherwise the field is optionally present, need ON. |

Figure 1A:
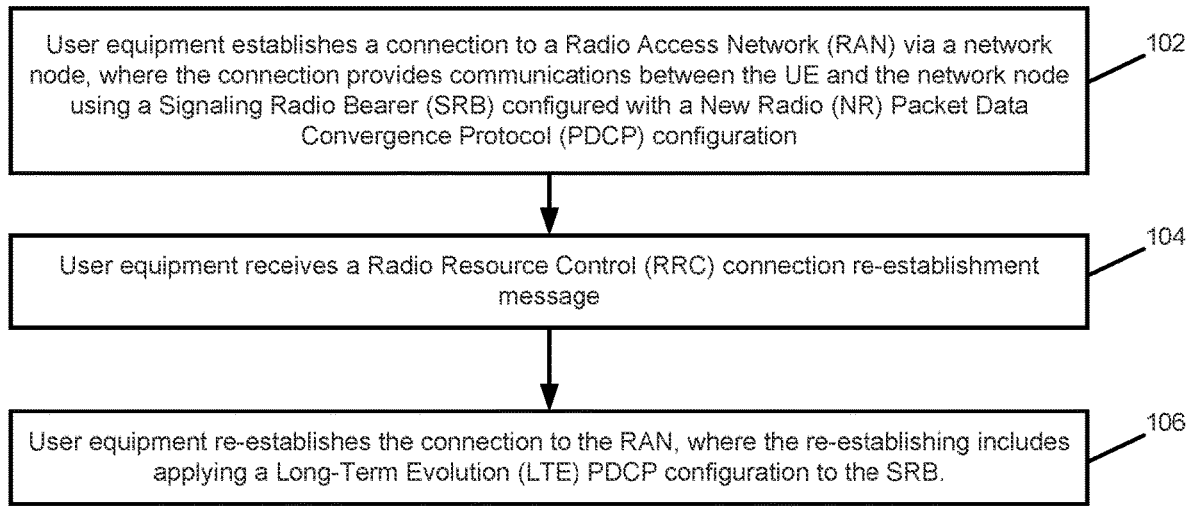
FIG. 1A is a flow diagram illustrating a method performed by a user equipment for re-establishing a connection to a RAN, according to some examples.
Figure 1B:
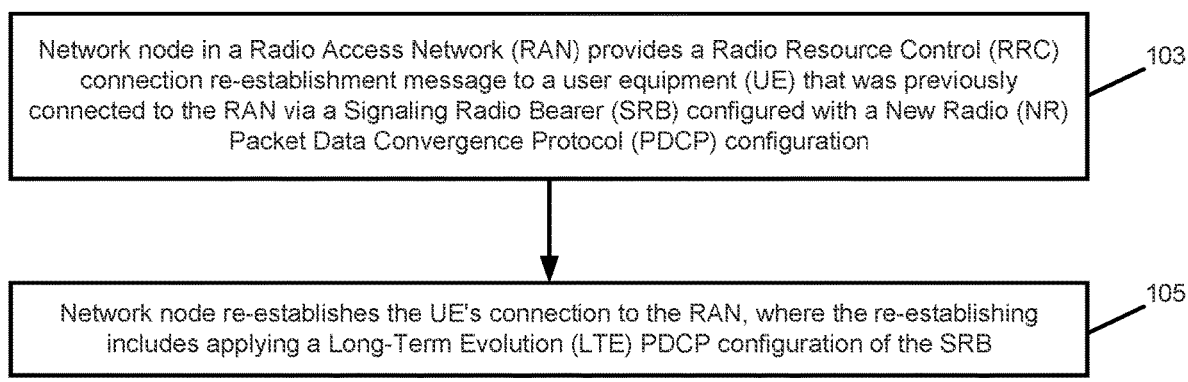

FIG. 1B is a flow diagram illustrating a method performed by a network node for re-establishing a UE's connection to a RAN, according to some examples.

Figure 1C:
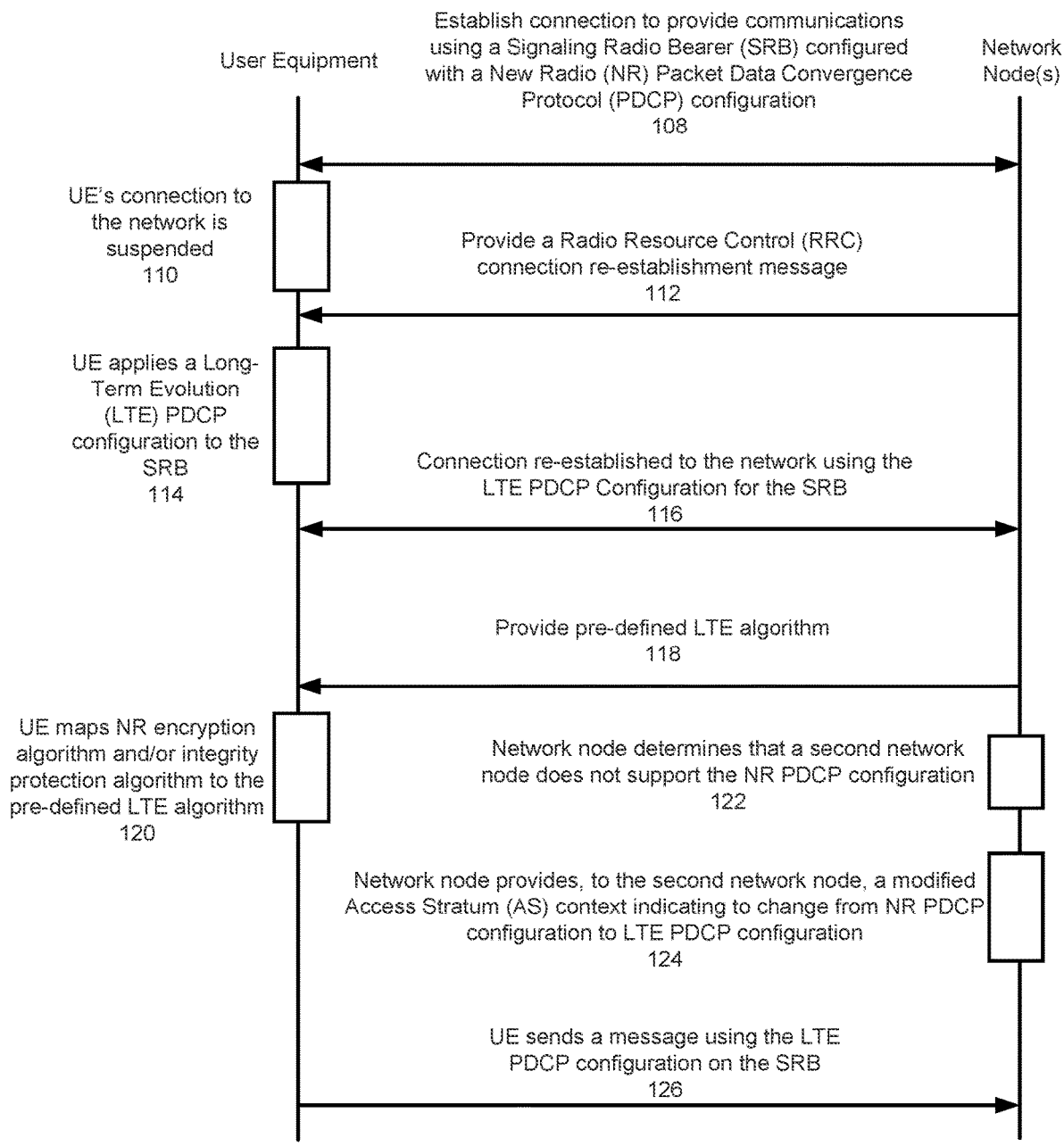

FIG. 1C is a signaling diagram illustrating a method performed by a user equipment and one or more network nodes.

Figure 2:
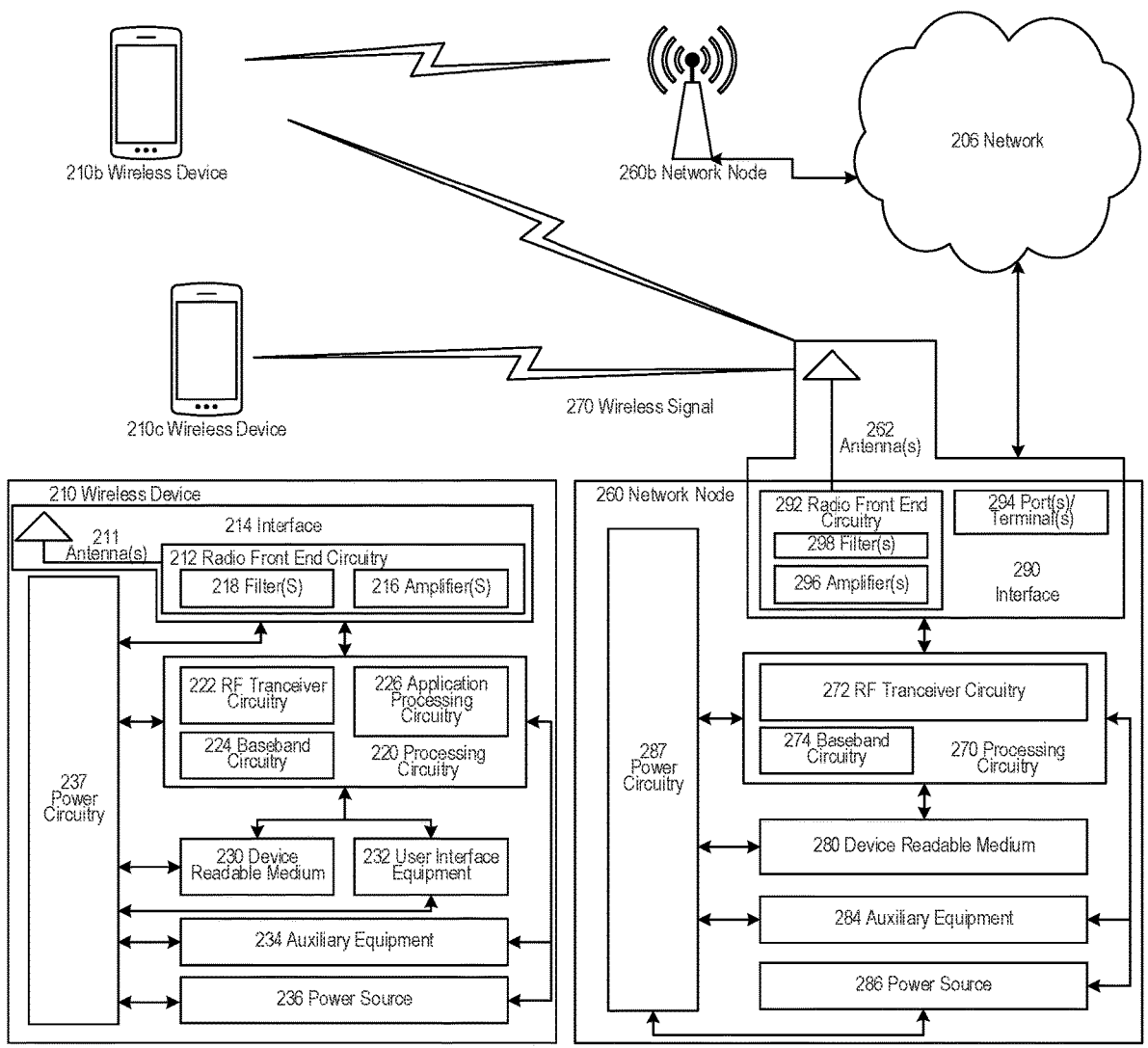

FIG. 2 is a block diagram illustrating a wireless network, according to some examples.

Figure 3:
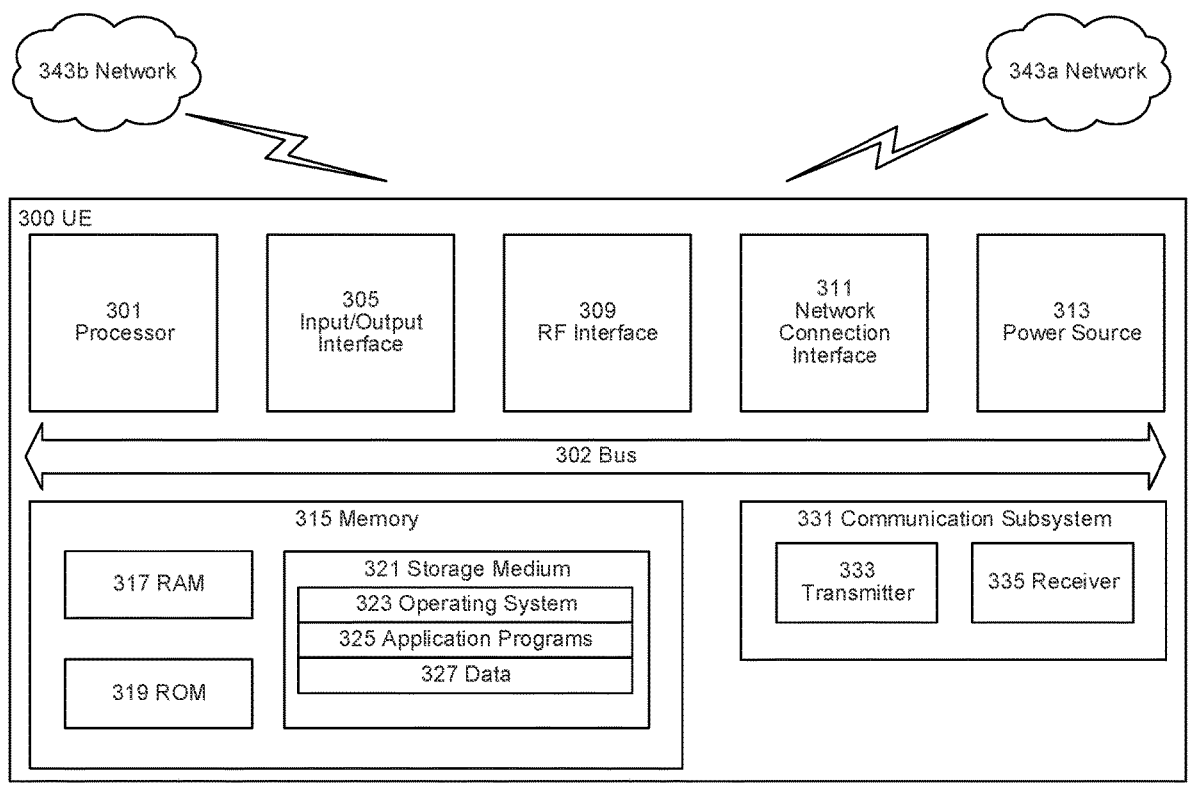

FIG. 3 is a block diagram illustrating a user equipment, according to some examples.

Figure 4:
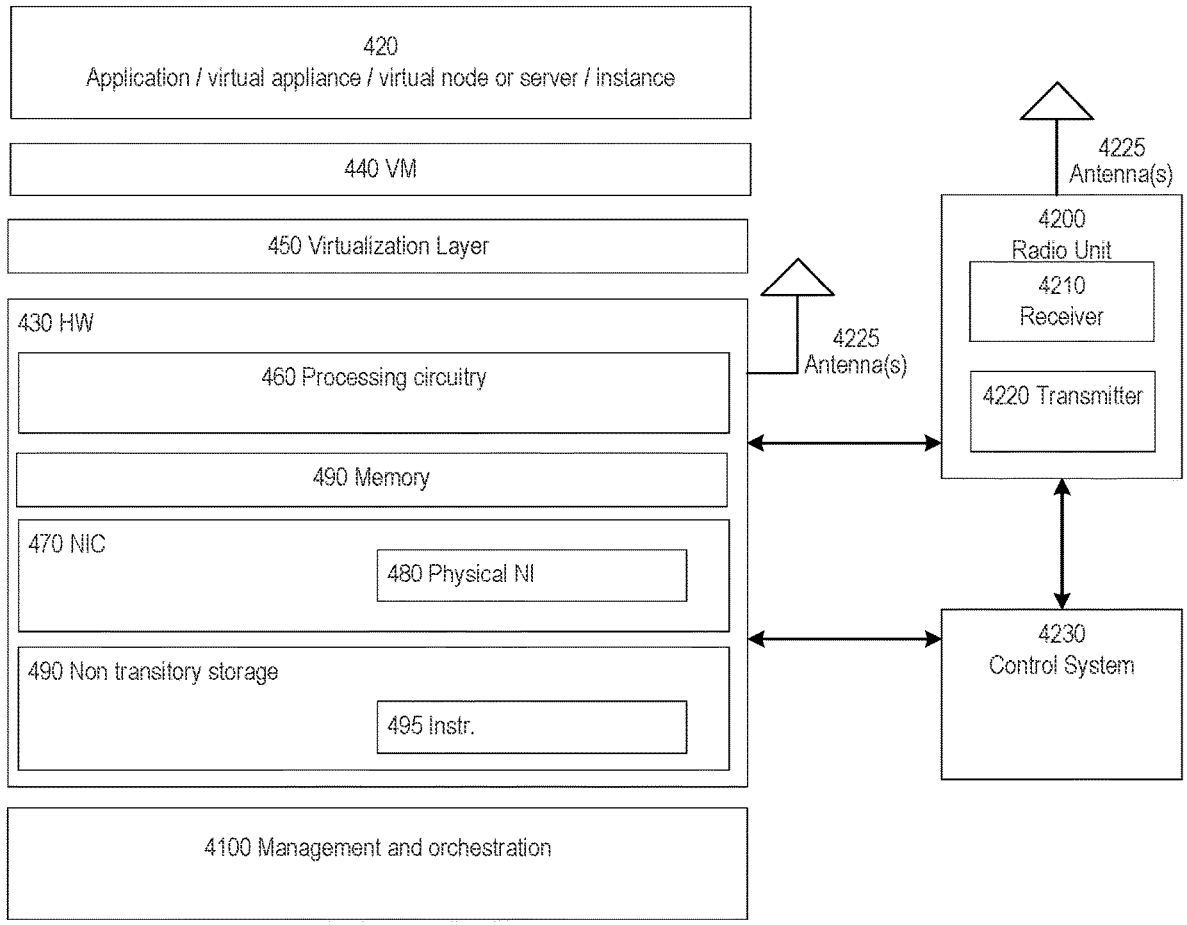

FIG. 4 is a block diagram illustrating a virtualization environment, according to some examples.

Figure 5:
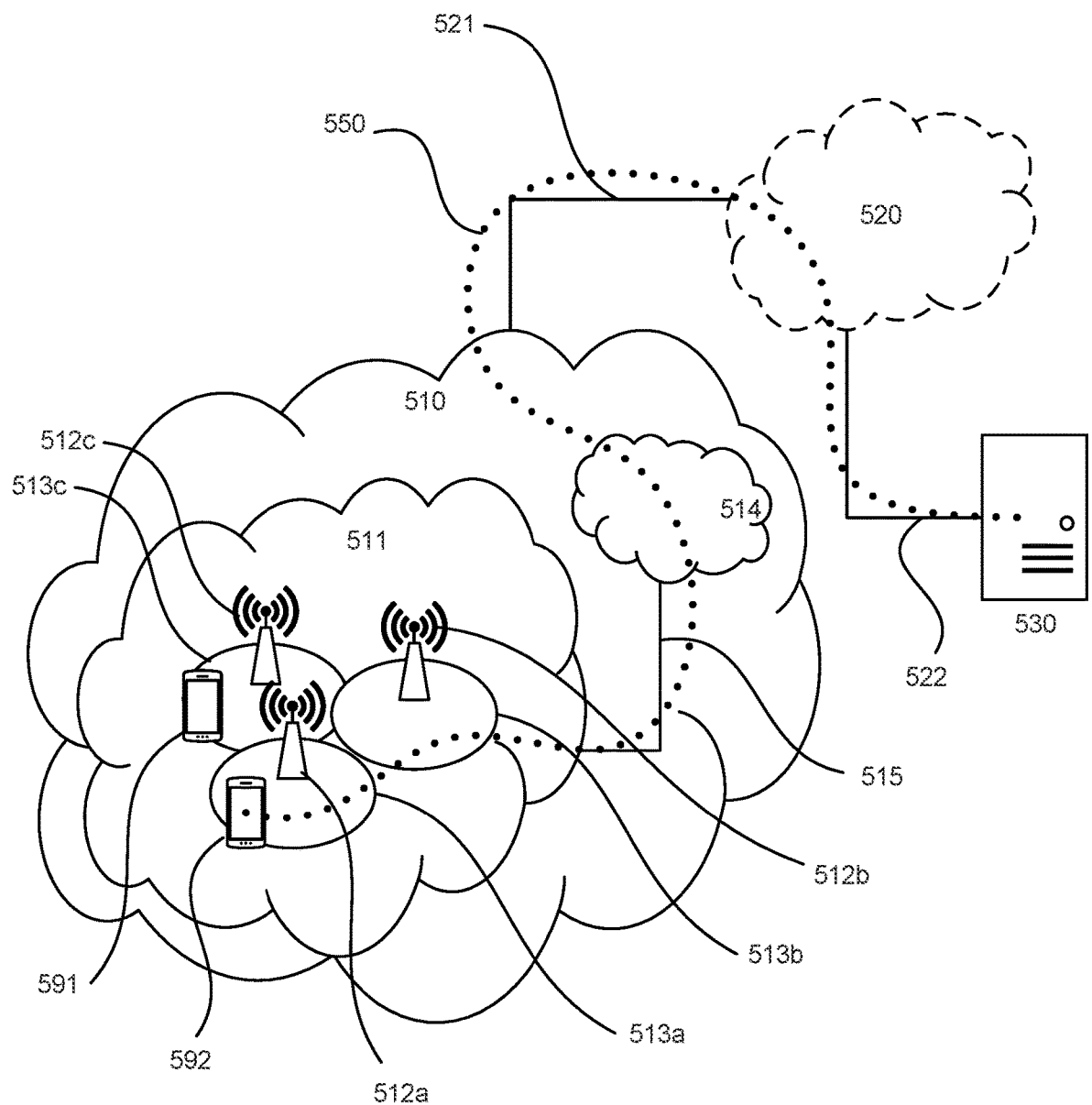

FIG. 5 is a block diagram illustrating a telecommunication network connected via an intermediate network to a host computer, according to some examples.

Figure 6:
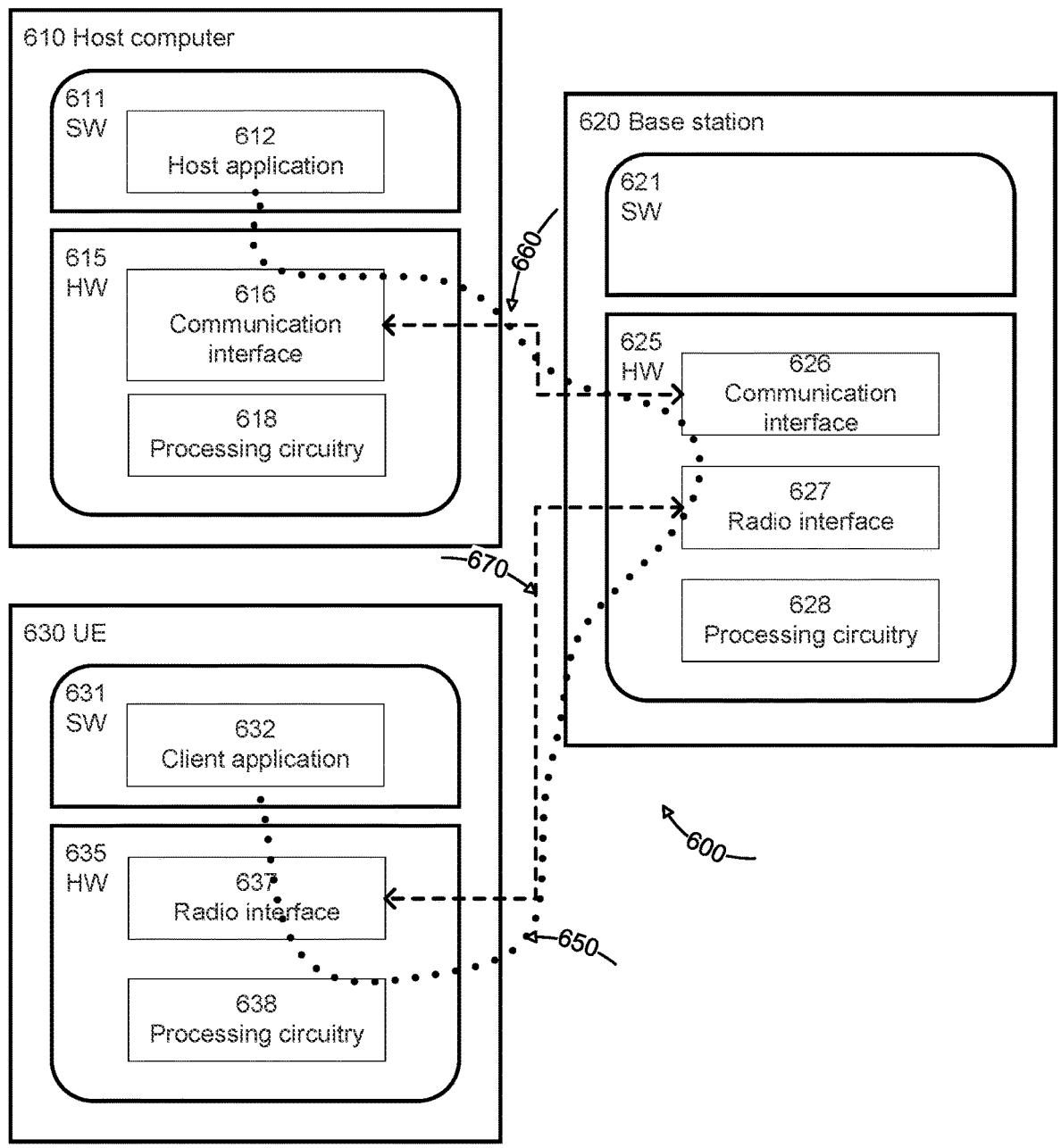

FIG. 6 is a block diagram illustrating a host computer communicating via a base station with a user equipment over a partially wireless connection, according to some examples.

DETAILED DESCRIPTION

Traditional techniques for re-establishing a connection between a UE and a network node have disadvantages that result in latency and/or disrupted communications. As an example, if a UE is initially connected to a first (source) base station that is NR capable, SRB1 may be configured to operate using NR PDCP. Thereafter, problems may arise if the UE is suspended from the network and re-establishes a connection to the network via a second (target) base station that does not support NR (for example, a legacy LTE base station). To illustrate these problems, Table 1, (below) illustrates different scenarios to consider with respect to a PDCP configuration used for SRB1 in the first and second base stations.

TABLE 1

Different cases of PDCP version usage for SRB1 and support of NR PDCP

| | Legacy First Base Station Legacy Second Base Station | Legacy First Base Station NR Second Base Station | NR First Base Station Legacy Second Base Station | NR First Base Station NR Second Base Station |
|---|---|---|---|---|
| SRB1 uses LTE PDCP | Successful Re-establishment | | | |
| SRB1 uses NR PDCP | Not applicable | | Failed Re-establishment | UE unable to know if the second base station supports NR PDCP |

In the instances shown above where the first base station is a legacy base station that does not support NR, SRB1 is configured to use LTE PDCP (and not NR PDCP). Accordingly, because an NR base station is generally backwards compatible with LTE PDCP, the RRC connection re-establishment procedures are able to be successfully completed in a transition of the UE from its connection with the first base station to a connection with the second base station regardless of whether the second base station is a legacy or NR base station. Similarly, if the first base station supports NR, but configures SRB1 to use LTE PDCP, the UE will be able to continue using the LTE PDCP configuration of SRB1 when it switches to a second base station, regardless of whether the second base station is a legacy or NR capable base station.

However, if the first base station is NR capable and configures SRB1 to use NR PDCP, problem occur when transitioning the UE to the second base station. For example, if the second base station is a legacy base station, the UE will be unable to re-establish RRC communications via the SRB1 that is configured with NR PDCP, because the legacy base station is not configured to operate using that protocol. For example, the second base station is unable to even process an RRCConnectionReestablishmentComplete message.

If both the first and the second base station are NR base stations, the UE can re-establish SRB1 with NR PDCP with the second base station. Under traditional signalling standards, however, the UE will not be informed regarding whether the second base station supports NR PDCP.

The present disclosure provides techniques that address PDCP configuration issues during connection re-establishment, like those illustrated above. In some embodiments, upon the reception of the RRCConnectionReestablishment message from a base station, a UE may perform the following steps:

1) re-establish PDCP for SRB1;
2) re-establish RLC for SRB1;
3) perform the radio resource configuration procedure in accordance with the received radioResourceConfigDedicated
4) resume SRB1;
5) update the KeNB key based on the KASME key (master security key for current UE connection/session; used to derive other keys) to which the current KeNB is associated, using the nextHopChainingCount value indicated in the RRCConnectionReestablishment message
6) derive the KRRCint key (security key for integrity protecting RRC messages) associated with the previously configured integrity algorithm;
7) derive the KRRCenc key (security key for encrypting/decrypting RRC messages) and the KUPenc key (security key for encrypting/decrypting user plane messages) associated with the previously configured ciphering algorithm
8) configure lower layers to activate integrity protection using the previously configured algorithm and the KRRCint key immediately, i.e., integrity protection shall be applied to all subsequent messages received and sent by the UE, including the message used to indicate the successful completion of the procedure;
9) configure lower layers to apply ciphering using the previously configured algorithm, the KRRCenc key and the KUPenc key immediately, i.e., ciphering shall be applied to all subsequent messages received and sent by the UE, including the message used to indicate the successful completion of the procedure; and
10) Construct and submit the RRCConnectionReestablishmentComplete message to lower layers for transmission When the target base station receives the RRCConnectionReestablishmentComplete message, it sends an RRCConnectionReconfiguration that will reconfigure SRB2 and the data radio bearers (DRBs).

The following example techniques may be performed relating to the re-establishing of PDCP for SRB1 (shown in step 1, above), in combination with one or more of the above steps to therefore handle a mismatch between use of NR PDCP and LTE PDCP for SRB1 at a first base station and second base station. These embodiments are not mutually exclusive, and may be combined and/or modified as appropriate. Moreover, while the techniques are described with respect to first and second base station, similar problems may occur with respect to a re-connection to a same base station (i.e., the source and target base stations are the same).

Embodiment 1 (UE): On re-establishment of a connection to the network via the target base station, the UE reverts (by default) to LTE PDCP configuration for SRB1. This technique addresses use cases where the source base station supports NR, and where SRB1 was previously configured with an NR PDCP configuration.

Embodiment 2 (network node): The source base station passes a modified UE AS context to the target base station, so that the UE context is understandable by the legacy target base station, i.e. not include the NR PDCP configuration for SRB1 or any other radio bearer that uses NR PDCP. This technique addresses use cases where the source base station supports NR, and where SRB1 was previously configured with an NR PDCP configuration.

Embodiment 2b (network node): An embodiment according embodiment 2, the source base station passes on a modified UE AS context to the target only if it determines that the target is a legacy base station that doesn't support NR. A drawback is that in case the target is able to support NR PDCP, SRB1 will end up using LTE PDCP.

Embodiment 3 (UE): On re-establishment, the UE will use the PDCP version of the SRB1, be it LTE or NR, that was used before re-establishment. In case the target is able to support NR PDCP, SRB1 will be resumed with NR PDCP.

Embodiment 4 (network node): The source base station, on determining that the target base station is a legacy base station that doesn't support NR, will refrain from passing the UE AS context information to the target.

Embodiment 5 (network node): If the target base station doesn't get a UE AS context form the source base station or it doesn't understand the context passed from the source base station, (e.g. due to the usage of NR PDCP configuration for SRB1 or any other radio bearer), it will initiate NAS recovery (i.e. the target base station to send an RRCConnectionSetup message to the UE, this will trigger the UE to send a NAS message (e.g., NAS service request, NAS tracking area update), when the CN receives the NAS message it will create a new UE S1 context in the target base station, allowing the target base station perform a full reconfiguration of all the bearers by utilizing the S1 context of the UE).

Embodiment 6 (network node): The UE is configured via the RRCConnectionReestablishment message, either implicitly or explicitly, to use either LTE or NR PDCP for SRB1. A flag is included in the RRCConnectionReestablishment message telling the UE which PDCP version to use for SRB1. A legacy base station will use legacy RRCConnectionReestablishment message (i.e. there will be no flag indicating which PDCP version to use).

Embodiment 7 (UE): If the UE receives an RRCConnectionReestablishment message with no PDCP version flag (i.e. the target base station doesn't support NR PDCP and it will use legacy RRCConnectionReestablishment message), or the flag indicates LTE PDCP (i.e. target base station supports NR PDCP, but for some reason doesn't want to configure NR PDCP for SRB1), the UE will resort to using LTE PDCP for SRB1.

Embodiment 8 (UE): If the UE receives an RRCConnectionReestablishment message with a flag indicating NR PDCP version for SRB1, the UE will re-establish SRB1 with NR PDCP. If SRB1 was configured with NR PDCP before re-establishment was initiated, the UE will just reuse/restore that PDCP configuration.

Embodiment 9 (network node): An embodiment according to embodiment 6, where the target base station also provides the NR PDCP configuration in addition to or instead of the PDCP version flag in the RRCConnectionReestablishment message.

Embodiment 10 (UE): An embodiment according to embodiment 9, where the UE receives an RRCConnectionReestablishment message that contains an NR PDCP configuration for SRB1, it will re-establish the SRB1 with NR PDCP, using the included NR PDCP configuration.

Embodiment 11 (network node): An embodiment according to earlier embodiments, where the target base station also provides the NR PDCP configuration (or/and indication) for SRB2 and/or data radio bearers (DRBs) in the RRCConnectionReestablishment message. The NR PDCP configuration could be an explicit flag indicating that NR PDCP should be used and/or a detailed configuration of the NR PDCP protocol, for the concerned bearers (i.e. SRB2 or DRBs).

Embodiment 12 (UE): An embodiment according to any of the previous embodiments, where the UE receives an RRCConnectionReestablishment message that contains an NR PDCP configuration for SRB1, it will re-establish the SRB1 as well as optionally SRB2 and data radio bearers (DRBs) with NR PDCP, using the included NR PDCP configuration. The NR PDCP configuration could be an explicit flag indicating that NR PDCP should be used and/or a detailed configuration of the NR PDCP protocol.

Embodiment 13 (UE): If the UE is changing the PDCP version from NR to LTE due to any of the previous embodiments, it also optionally performs a mapping from NR security algorithms for encryption and integrity protection to pre-defined LTE algorithms. Similar mapping can also be performed when changing from LTE PDCP to NR PDCP (mapping from LTE algorithm to NR algorithm). The mappings could be 1-to-1 for NR and LTE algorithms, which have similar properties. For new NR-only algorithms it is possible to map to a predefined (or default) LTE algorithm. The predefined (or default) LTE algorithm could either be signalled to the UE (e.g. when connected to NR, using NAS or RRC signalling) or it could be "hardcoded" in 3GPP specifications.

Embodiment 14 (network node): If the UE is changing the PDCP version from NR to LTE due to any of the previous embodiments, the network (e.g. the target or source base station) can optionally perform a mapping from NR security algorithms for encryption and integrity protection to pre-defined LTE algorithms Similar mapping can also be performed when changing from LTE PDCP to NR PDCP (mapping from LTE algorithm to NR algorithm). The mappings could be 1-to-1 for NR and LTE algorithms which have similar properties. For new NR-only algorithms it is possible to map to a predefined (or default) LTE algorithm. The predefined (or default) LTE algorithm could either be configured in the network and signalled to the UE (e.g. when connected to NR, using NAS or RRC signalling) or it could be "hardcoded" in 3gpp specifications.

Certain embodiments may provide one or more of the following technical advantages. According to certain embodiments described herein, a connection can be re-established with an NR PDCP configuration of SRB1 if the target base station supports NR PDCP. Without these embodiments, it is not possible to employ NR PDCP for SRB1 at re-establishment. Certain embodiments may provide all, some, or none of these technical advantages, and additional technical advantages may be readily apparent form the description below.

FIG. 1A is a flow diagram illustrating a method performed by a user equipment for re-establishing a connection to a RAN, according to some examples. In some example, the user equipment is a wireless device. This method may be performed in combination with a method performed by a network node, such as the method described with respect to FIG. 1B. Moreover, this method may be implemented by a user equipment apparatus or in a system including a user equipment, as described with respect to FIGS. 2-6.

At step 102, the user equipment establishes a connection to a RAN via a network node, where the connection provides communications between the UE and the network node using a Signaling Radio Bearer (SRB) configured with a New Radio (NR) Packet Data Convergence Protocol (PDCP) configuration. In some examples, the SRB includes Signaling Radio Bearer 1 (SRB1). Subsequently, the user equipment's connection may be suspended, such that the user equipment is disconnected from the network.

At step 104, the user equipment receives an RRC connection re-establishment message from a network node. In some examples, the UE also receives receiving a pre-defined LTE algorithm and/or NR integrity protection algorithm from the network node.

At step 106, the user equipment re-establishes the connection to the RAN, where the re-establishing includes applying a Long-Term Evolution (LTE) PDCP configuration to the SRB. In some examples, the UE also maps a received NR encryption algorithm and/or an NR integrity protection algorithm to a pre-defined LTE algorithm. Accordingly, the UE is able to receive messages from the network node on the SRB and decode the messages using the LTE PDCP configuration and security configuration (such as the mapped pre-defined LTE algorithm) of the SRB. These messages may include, for example, an RRCReestablishment command that is received at the UE from the network node, which the UE decodes using the LTE PDCP and security configurations.

In the above example, a same network node interacts with the UE in steps 102, 104, and 106. However, in other examples, the method may be performed by the UE interacting with multiple network nodes. In this multi-node variation of the above example, the UE establishes a connection via a first network node in step 102. In step 104, after the connection with the first network node is suspended, the UE receives the connection re-establishment message from a second network node that is different than the first network node. In step 106, the UE re-establishes the connection to the RAN via the second network node.

Following the re-establishment of the UE's connection to the RAN, the UE may send messages to the network node (or a second network node) using the LTE PDCP configuration on the SRB.

FIG. 1B is a flow diagram illustrating a method performed by a network node for re-establishing a UE's connection to a RAN, according to some examples. In some examples, the network node is a base station, such as an eNB or a gNB. This method may be performed in combination with a method performed by a user equipment, such as the method described with respect to FIG. 1A. Moreover, this method may be implemented by a network node apparatus or in a system including a network node, as described with respect to At step 103, the network node in a RAN provides an RRC connection re-establishment message to a UE that was previously connected to the RAN via a Signaling Radio Bearer (SRB) configured with a New Radio (NR) Packet Data Convergence Protocol (PDCP) configuration. In some examples, step 103 is performed after step 102 is performed by a user equipment. In some examples, the UE was previously connected to the RAN via the network node, while in other examples, the UE was previously connected to the RAN via a second network node that is different than the network node.

At step 105, the network node re-establishes the UE's connection to the RAN, where the re-establishing includes applying a Long-Term Evolution (LTE) PDCP configuration of the SRB. In some examples, step 105 is performed after step 104 is performed by a user equipment.

In the examples where the UE was previously connected to the RAN via a second network node, the second network node may determine that the network node does not support the NR PDCP configuration. Accordingly, the network node may receive, from the second network node, a modified Access Stratum (AS) context corresponding to the UE, where the modified AS context includes an indication to change from the NR PDCP configuration to the LTE PDCP configuration.

FIG. 1C is a signaling diagram illustrating a method performed by a user equipment and one or more network nodes. In some examples, the network node(s) include one or more base stations, such as eNBs and/or gNBs. The sequence illustrated in the signaling diagram may be implemented by a user equipment, network node, and/or in a system including a user equipment and network node, as described with respect to FIGS. 2-6.

At step 108, a UE and a network node establish a connection to a network (such as a RAN network) to provide communications using an SRB configured with an NR PDCP configuration.

At step 110, the UE's connection to the network is suspended. At step 112, the network node or a second network node provides an RRC connection re-establishment message to the UE.

At step 114, the UE applies an LTE PDCP configuration to the SRB. In the present example, the LTE PDCP configuration is a default configuration that the UE applies when interacting with a network node during an RRC connection re-establishment procedure. Accordingly, at step 116 a connection is established from the UE to the network using the LTE PDCP configuration for the SRB.

In some examples, at step 118 the network node provides a pre-defined LTE algorithm to the UE, which the UE may use for network communications. In this example, at step 120 the UE maps an NR encryption algorithm and/or integrity protection algorithm to the received pre-defined LTE algorithm. In some examples, the UE is pre-configured with the NR encryption algorithm and/or integrity protection algorithm. Accordingly, the UE can use the pre-defined LTE algorithm and LTE PDCP configuration of the SRB to decode messages that are received on the SRB from the network node.

In the event that the UE's connection with the network is through a second network node, at step 122, the network node may determine that the second network does not support an NR PDCP configuration. Accordingly, if the second network node does not support the NR PDCP configuration, at step 124 the network node provides the second node with a modified access stratum (AS) context that indicates to change from an NR PDCP configuration to the LTE PDCP configuration. Accordingly, the second network node is notified to change to an NR PDCP configuration so that it may communicate with the UE. Steps 122 and 124 may be skipped if the connection to the network is re-established in step 116 via the network node rather than a second network node.

At step 126, the UE sends a message to the RAN network, via the network node or the second network node, using the LTE PDCP configuration on the SRB.

FIG. 2 is a block diagram illustrating a wireless network, according to some examples. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 depicts network 206, network nodes 260 and 260*b*, and wireless devices 210, 210*b*, and 210*c*. In practice, a wireless network may further include any additional elements suitable to support communication between wireless devices or between a wireless device and another communication device, such as a landline telephone, a service provider, or any other network node or end device. Of the illustrated components, network node 260 and wireless device 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and wireless device 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, next generation Node B's (gNBs), and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB, gNB, or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signaling and/or data between network node 260, network 206, and/or wireless devices 210, 210b, 210c. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or wireless devices via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device refers to a device capable, configured, arranged and/or operable to communicate wirelessly with network nodes and/or other wireless devices. In some examples, a UE is implemented as a wireless device. Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. Wireless device 210 may include multiple sets of one or more of the illustrated components for different wireless technologies supported by wireless device 210, such as, for example, GSM, WCDMA, LTE, NR, WiFi, WiMAX, or Bluetooth wireless technologies, just to mention a few. These wireless technologies may be integrated into the same or different chips or set of chips as other components within wireless device 210.

Antenna 211 may include one or more antennas or antenna arrays, configured to send and/or receive wireless signals, and is connected to interface 214. In certain alternative embodiments, antenna 211 may be separate from wireless device 210 and be connectable to wireless device 210 through an interface or port. Antenna 211, interface 214, and/or processing circuitry 220 may be configured to perform any receiving or transmitting operations described herein as being performed by a wireless device. Any information, data and/or signals may be received from a network node and/or another wireless device. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, wireless device 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or wireless devices via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 210 components, such as device readable medium 230, wireless device 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of wireless device 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a wireless device may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner In any of those particular embodiments, whether executing instructions stored on a device readable storage medium or not, processing circuitry 220 can be configured to perform the described functionality. The benefits provided by such functionality are not limited to processing circuitry 220 alone or to other components of wireless device 210, but are enjoyed by wireless device 210 as a whole, and/or by end users and the wireless network generally.

Processing circuitry 220 may be configured to perform any determining, calculating, or similar operations (e.g., certain obtaining operations) described herein as being performed by a wireless device. These operations, as performed by processing circuitry 220, may include processing information obtained by processing circuitry 220 by, for example, converting the obtained information into other information, comparing the obtained information or converted information to information stored by wireless device 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with wireless device 210. Such interaction may be of many forms, such as visual, audial, tactile, etc. User interface equipment 232 may be operable to produce output to the user and to allow the user to provide input to wireless device 210. The type of interaction may vary depending on the type of user interface equipment 232 installed in wireless device 210. For example, if wireless device 210 is a smart phone, the interaction may be via a touch screen; if wireless device 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into wireless device 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from wireless device 210, and to allow processing circuitry 220 to output information from wireless device 210. User interface equipment 232 may include, for example, a speaker, a display, vibrating circuitry, a USB port, a headphone interface, or other output circuitry. Using one or more input and output interfaces, devices, and circuits, of user interface equipment 232, wireless device 210 may communicate with end users and/or the wireless network, and allow them to benefit from the functionality described herein.

Auxiliary equipment 234 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. Wireless device 210 may further comprise power circuitry 237 for delivering power from power source 236 to the various parts of wireless device 210 which need power from power source 236 to carry out any functionality described or indicated herein. Power circuitry 237 may in certain embodiments comprise power management circuitry. Power circuitry 237 may additionally or alternatively be operable to receive power from an external power source; in which case wireless device 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of wireless device 210 to which power is supplied.

FIG. 3 is a block diagram illustrating a user equipment, according to some examples. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE 300, as illustrated in FIG. 3, is one example of a wireless device configured for communication in accordance with one or more communication standards promulgated by the 3rd Generation Partnership Project (3GPP), such as 3GPP's GSM, UMTS, LTE, and/or 5G standards. Accordingly, although FIG. 3 is a UE, the components discussed herein are equally applicable to a wireless device, and vice-versa.

In FIG. 3, UE 300 includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343a. Network 343a may encompass wired and/or wireless networks such as a local-area network (LAN), a wide-area network (WAN), a computer network, a wireless network, a telecommunications network, another like network or any combination thereof. For example, network 343a may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343b using communication subsystem 331. Network 343a and network 343b may be the same network or networks or different network or networks. Communication subsystem 331 may be configured to include one or more transceivers used to communicate with network 343b. For example, communication subsystem 331 may be configured to include one or more transceivers used to communicate with one or more remote transceivers of another device capable of wireless communication such as another wireless device, UE, or base station of a RAN according to one or more communication protocols, such as IEEE 802.3, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343b may encompass wired and/or wireless networks such as a local-area network (LAN), a wide-area network (WAN), a computer network, a wireless network, a telecommunications network, another like network or any combination thereof. For example, network 343b may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

FIG. 4 is a block diagram illustrating a virtualization environment, in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment that provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signaling can be effected with the use of control system 4230 which may alternatively be used for communication between the hardware nodes 430 and radio units 4200.

FIG. 5 is a block diagram illustrating a telecommunication network connected via an intermediate network to a host computer, according to some examples. In accordance with an embodiment, a communication system includes telecommunication network 510, such as a 3GPP-type cellular network, which comprises access network 511, such as a radio access network, and core network 514. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more sub-networks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591 Similarly, base station 512 need not be aware of the future routing of an outgoing uplink communication originating from the UE 591 towards the host computer 530.

FIG. 6 is a block diagram illustrating a host computer communicating via a base station with a user equipment over a partially wireless connection, according to some examples. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 having hardware 635 including radio interface 637 that is configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve the data rate and latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Modifications, additions, or omissions may be made to the methods, systems, and apparatuses described herein without departing from the scope of the disclosure. The methods may include more, fewer, or other steps. Additionally, steps may be performed in any suitable order. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A host configured to operate in a communication system to provide an over-the-top (OTT) service, the host comprising:
   processing circuitry configured to provide user data associated with the OTT service; and
   a network interface configured to initiate transmission of the user data from a network node in a cellular network, the network node having a communication interface and processing circuitry, the processing circuitry of the network node configured to perform operations comprising:
   providing a Radio Resource Control (RRC) connection re-establishment message to a user equipment (UE) that was previously connected to a Radio Access Network (RAN) via Signaling Radio Bearer 1 (SRB1),
      wherein the connection re-establishment message includes a radioResourceConfigDedicated information element (IE),
      wherein SRB1 is configured with a New Radio (NR) Packet Data Convergence Protocol (PDCP) configuration, and
      wherein after the UE receives the RRC connection re-establishment message, the UE derives a plurality of security keys;
   re-establishing the UE's connection to the RAN, the re-establishing including applying a Long-Term Evolution (LTE) PDCP configuration to SRB1 and applying ciphering using the plurality of derived security keys;
   mapping at least one of an NR encryption algorithm or an NR integrity protection algorithm to a pre-defined LTE algorithm; and
   transmitting the user data over the re-established connection.

2. The host of claim 1, wherein:
   the processing circuitry of the host is configured to execute a host application, thereby providing the user data; and
   the host application is configured to interact with a client application executing on the UE, the client application being associated with the OTT service.

3. The host of claim 1, wherein the operations further comprise:
   receiving, from a second network node, a modified Access Stratum (AS) context corresponding to the UE, wherein prior to receiving the modified AS context, the second network node determines that the network node does not support the NR PDCP configuration.

4. The host of claim 3, wherein the modified AS context comprises an indication to change from the NR PDCP configuration to the LTE PDCP configuration.

5. The host of claim 1, wherein the operations further comprise:
   receiving, using the LTE PDCP configuration on SRB1, a message from the UE.

6. The host of claim 1, wherein the plurality of security keys comprises an RRC message integrity protection key ($K_{RRCint}$), an RRC message encryption key ($K_{RRCenc}$), and a user plane encryption key ($K_{UPenc}$).

7. A method implemented in a host configured to operate in a communication system that further includes a network node and a user equipment (UE) to provide an over-the-top (OTT) service, the method comprising:
   providing user data for the UE; and
   initiating a transmission carrying the user data to the UE via a cellular network comprising the network node, wherein the network node performs operations comprising:
   providing a Radio Resource Control (RRC) connection re-establishment message to a user equipment (UE) that was previously connected to a Radio Access Network (RAN) via Signaling Radio Bearer 1 (SRB1), wherein the connection re-establishment message includes a radioResourceConfigDedicated information element (IE), wherein SRB1 is configured with a New Radio (NR) Packet Data Convergence Protocol (PDCP) configuration, and wherein after the UE receives the RRC connection re-establishment message, the UE derives a plurality of security keys including an RRC message integrity protection key ($K_{RRCint}$), an RRC message encryption key ($K_{RRCenc}$), and a user plane encryption key ($K_{UPenc}$):
   re-establishing the UE's connection to the RAN, the re-establishing including applying a Long-Term Evolution (LTE) PDCP configuration to SRB1 and applying ciphering using the plurality of derived security keys;
   mapping at least one of an NR encryption algorithm or an NR integrity protection algorithm to a pre-defined LTE algorithm; and
   transmitting the user data over the re-established connection.

8. The method of claim 7, wherein the host is configured to execute a host application to the user data provide the user data to a client application executing on the UE, the client application being associated with the OTT service.

9. The method of claim 8, wherein the operations further comprise:
   receiving, from a second network node, a modified Access Stratum (AS) context corresponding to the UE, wherein prior to receiving the modified AS context, the second network node determines that the network node does not support the NR PDCP configuration.

10. The method of claim 9, wherein the modified AS context comprises an indication to change from the NR PDCP configuration to the LTE PDCP configuration.

11. The method of claim 7, wherein the plurality of security keys comprises an RRC message integrity protection key ($K_{RRCint}$), an RRC message encryption key ($K_{RRCenc}$), and a user plane encryption key ($K_{UPenc}$).

12. The method of claim 7, wherein the operations further comprise:
   receiving, using the LTE PDCP configuration on SRB1, a message from the UE.

* * * * *

UNITED STATES PATENT AND TRADEMARK OFFICE
CERTIFICATE OF CORRECTION

PATENT NO. : 11,457,498 B2
APPLICATION NO. : 17/543260
DATED : September 27, 2022
INVENTOR(S) : Teyeb et al.

It is certified that error appears in the above-identified patent and that said Letters Patent is hereby corrected as shown below:

In the Specification

In Column 1, Line 39, delete "SRB ibis," and insert -- SRB1bis, --, therefor.

In Column 3, Line 12, delete "(SRB ibis" and insert -- (SRB1bis --, therefor.

In Column 3, Line 34, delete "SRB ibis" and insert -- SRB1bis --, therefor.

In Column 3, Line 41, delete "physCellld," and insert -- physCellId, --, therefor.

In Column 3, Line 46, delete "phyCellld)." and insert -- physCellId). --, therefor.

In Column 6, Lines 23-24, delete "radioResourceConfigDedic ated" and insert -- radioResourceConfigDedicated; --, therefor.

In Column 8, Line 60, delete "algorithms" and insert -- algorithms. --, therefor.

In Column 10, Line 7, delete "to" and insert -- to FIGS. 2-6. --, therefor.

In Column 13, Line 65, delete "manner" and insert -- manner. --, therefor.

In Column 18, Line 10, delete "manner" and insert -- manner. --, therefor.

In Column 25, Line 3, delete "UE 591" and insert -- UE 591. --, therefor.

In the Claims

In Column 28, Line 32, in Claim 7, delete "($K_{UPenc}$):" and insert -- ($K_{UPenc}$); --, therefor.

Signed and Sealed this
Fourth Day of July, 2023

Katherine Kelly Vidal
*Director of the United States Patent and Trademark Office*